(12) United States Patent
Fukawatase et al.

(10) Patent No.: US 9,085,279 B2
(45) Date of Patent: Jul. 21, 2015

(54) SIDE AIRBAG DEVICE FOR VEHICLE

(75) Inventors: Osamu Fukawatase, Miyoshi (JP); Takehisa Shamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/510,470

(22) PCT Filed: Nov. 17, 2010

(86) PCT No.: PCT/JP2010/070508
§ 371 (c)(1),
(2), (4) Date: May 17, 2012

(87) PCT Pub. No.: WO2012/066660
PCT Pub. Date: May 24, 2012

(65) Prior Publication Data
US 2013/0229003 A1 Sep. 5, 2013

(51) Int. Cl.
*B60R 21/207* (2006.01)
*B60R 21/231* (2011.01)
(Continued)

(52) U.S. Cl.
CPC .............. *B60R 21/207* (2013.01); *B60R 21/233* (2013.01); *B60R 21/2338* (2013.01); *B60R 21/23138* (2013.01); *B60R 2021/0039* (2013.01); *B60R 2021/23146* (2013.01)

(58) Field of Classification Search
CPC .... B60R 21/18; B60R 21/207; B60R 21/233; B60R 21/231; B60R 21/23138; B60R 2021/23308; B60R 2021/23146

USPC ........ 280/730.2, 733, 729, 743.1, 801.1, 803, 280/804
See application file for complete search history.

(56) References Cited

U.S. PATENT DOCUMENTS 5,112,079 A * 5/1992 Haland et al. ............... 280/730.2
5,161,821 A * 11/1992 Curtis ......................... 280/730.2
(Continued)

FOREIGN PATENT DOCUMENTS

CN          101746341 A     6/2010
DE     102009006879 A1    9/2009
(Continued)

OTHER PUBLICATIONS

International Search Report issued in International Application No. PCT/JP2010/070508 dated Feb. 22, 2011 (with translation).
(Continued)

*Primary Examiner* — Karen Beck
(74) *Attorney, Agent, or Firm* — Oliff PLC

(57) ABSTRACT

At a side airbag, integrally provided are a waist portion protecting bag portion that is expanded between a waist portion of a seated passenger and a vehicle body side portion, and a chest portion/shoulder portion protecting bag portion that is expanded between a chest portion and shoulder portion of the seated passenger and a vehicle body side portion. A non-inflating portion, to which gas is not supplied, is provided so as to extend from a peripheral edge portion of a vehicle front side of the side airbag to outer peripheral portions of the waist portion protecting bag portion and the chest portion protecting bag portion, so that a front side upper end portion of the waist portion protecting bag portion at a time of expansion is positioned at a lower side of a lap side webbing that restrains the waist portion of the seated passenger.

10 Claims, 10 Drawing Sheets

(51) Int. Cl.
*B60R 21/233* (2006.01)
*B60R 21/2338* (2011.01)
*B60R 21/00* (2006.01)

(56) References Cited

U.S. PATENT DOCUMENTS

| | | | | |
|---|---|---|---|---|
| 5,556,128 | A * | 9/1996 | Sinnhuber et al. | 280/730.2 |
| 5,722,685 | A * | 3/1998 | Eyrainer | 280/730.2 |
| 5,871,230 | A * | 2/1999 | Lewis | 280/733 |
| 5,913,536 | A * | 6/1999 | Brown | 280/730.2 |
| 6,378,898 | B1 * | 4/2002 | Lewis et al. | 280/733 |
| 6,533,315 | B2 * | 3/2003 | Brown et al. | 280/733 |
| 7,063,350 | B2 * | 6/2006 | Steimke et al. | 280/729 |
| 7,086,663 | B2 * | 8/2006 | Honda | 280/730.2 |
| 7,198,288 | B2 * | 4/2007 | Kim et al. | 280/730.2 |
| 7,258,189 | B2 * | 8/2007 | Kohama | 180/268 |
| 7,448,645 | B2 * | 11/2008 | Bederka et al. | 280/730.2 |
| 7,654,562 | B2 * | 2/2010 | Klima et al. | 280/730.2 |
| 7,669,887 | B2 * | 3/2010 | Svenbrant et al. | 280/730.2 |
| 7,819,424 | B2 * | 10/2010 | Toda et al. | 280/730.2 |
| 7,946,616 | B2 * | 5/2011 | Ochiai et al. | 280/730.2 |
| 8,286,995 | B2 * | 10/2012 | Shibayama et al. | 280/730.2 |
| 8,448,981 | B2 * | 5/2013 | Fukawatase | 280/730.2 |
| 8,528,934 | B2 * | 9/2013 | Kobayshi et al. | 280/740 |
| 2006/0022441 | A1 * | 2/2006 | Hayashi et al. | 280/730.2 |
| 2006/0131847 | A1 * | 6/2006 | Sato et al. | 280/730.2 |
| 2006/0267317 | A1 * | 11/2006 | Ida et al. | 280/730.2 |
| 2007/0138774 | A1 * | 6/2007 | Klima et al. | 280/730.2 |
| 2007/0182135 | A1 | 8/2007 | Kai et al. | |
| 2007/0228699 | A1 * | 10/2007 | Bederka et al. | 280/730.2 |
| 2007/0267851 | A1 * | 11/2007 | Svenbrant et al. | 280/729 |
| 2007/0290488 | A1 * | 12/2007 | Taguchi et al. | 280/730.2 |
| 2008/0084056 | A1 * | 4/2008 | Wright | 280/808 |
| 2009/0206585 | A1 * | 8/2009 | Honda | 280/730.2 |
| 2009/0212539 | A1 | 8/2009 | Honda et al. | |
| 2009/0212542 | A1 | 8/2009 | Toda et al. | |
| 2010/0140906 | A1 * | 6/2010 | Honda et al. | 280/730.2 |
| 2010/0201108 | A1 * | 8/2010 | Iwayama et al. | 280/730.2 |
| 2011/0298201 | A1 * | 12/2011 | Kobayashi et al. | 280/736 |
| 2013/0175792 | A1 * | 7/2013 | Fukawatase et al. | 280/728.2 |
| 2013/0229003 | A1 * | 9/2013 | Fukawatase et al. | 280/730.2 |

FOREIGN PATENT DOCUMENTS

| | | |
|---|---|---|
| JP | A-2003-220919 | 8/2003 |
| JP | A-2003-285709 | 10/2003 |
| JP | A-2004-050901 | 2/2004 |
| JP | A-2007-083835 | 4/2007 |
| JP | A-2007-210371 | 8/2007 |
| JP | A-2008-143273 | 6/2008 |
| JP | A-2008-207765 | 9/2008 |
| JP | A-2008-296722 | 12/2008 |
| JP | A-2009-196540 | 9/2009 |
| JP | A-2010-036870 | 2/2010 |

OTHER PUBLICATIONS

Jan. 27, 2015 Office Action issued in German Application No. 112010006002.9.

* cited by examiner

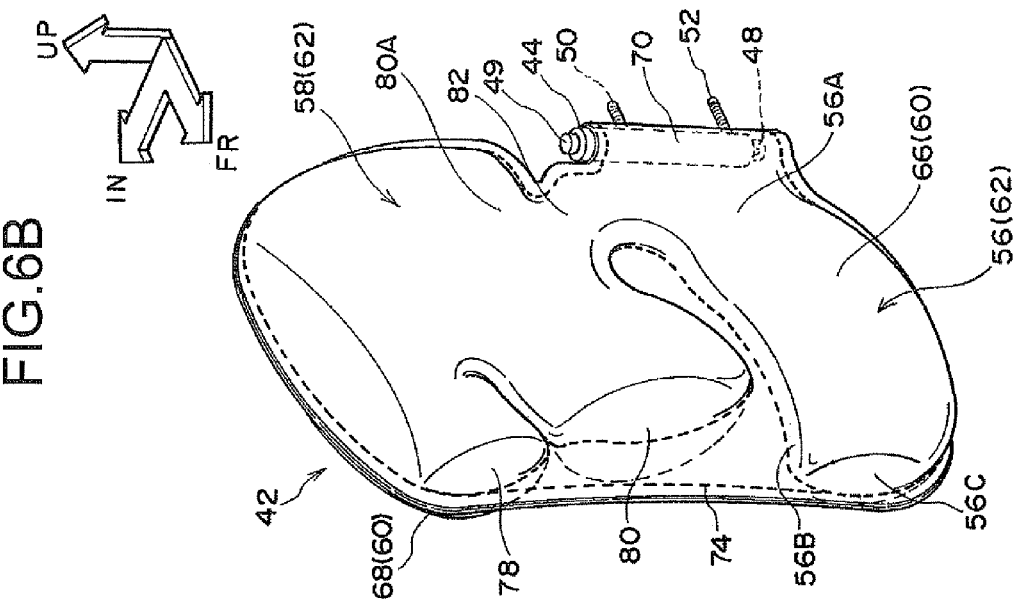
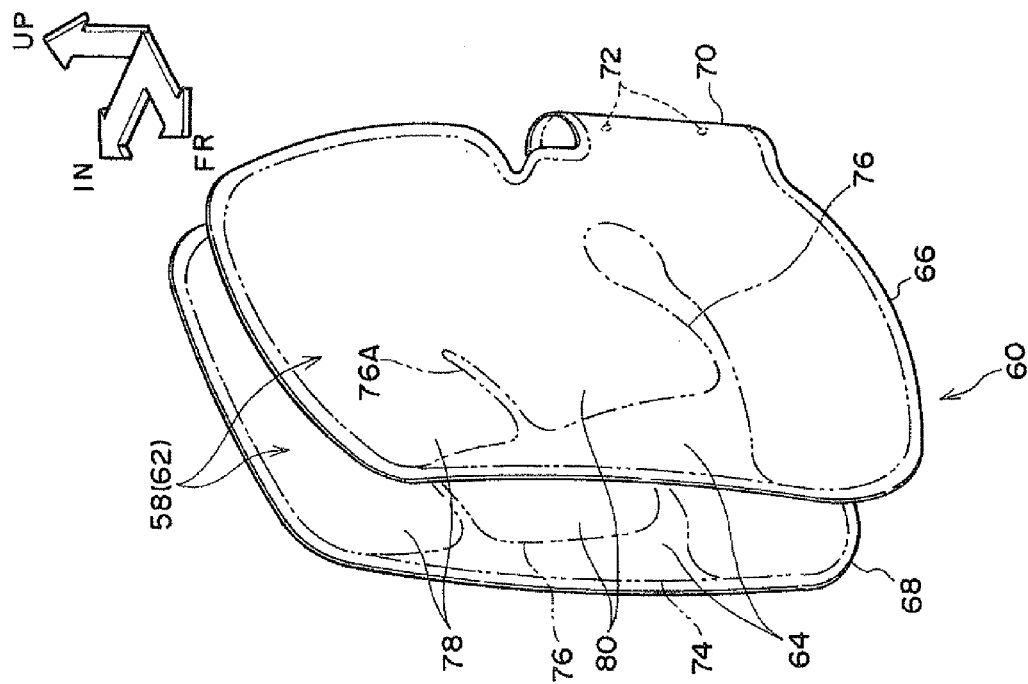

1

SIDE AIRBAG DEVICE FOR VEHICLE

TECHNICAL FIELD

The present invention relates to a side airbag device for a vehicle.

BACKGROUND ART

A side airbag device for a rear seat, that is provided with an airbag that protects from the shoulder portion to the waist portion of a seated passenger, is disclosed in following Patent Document 1. Further, a two-chamber-type side airbag device for a rear seat, that is divided by a seam into a lower inflation chamber (a waist portion chamber) and an upper inflation chamber (a from the shoulder to the chest portion chamber), is disclosed in following Patent Document 2.

[Patent Document 1] Japanese Patent Application Laid-Open No. 2007-083835
[Patent Document 2] Japanese Patent Application Laid-Open No. 2007-210371

DISCLOSURE OF INVENTION

Technical Problem

By the way, when a three-point seat belt device is installed at a rear seat, the shoulder side webbing spans at an incline over the front surface of the chest portion of the seated passenger, and the lap side webbing spans over lower side of the abdomen portion (a vicinity of the waist portion) of the seated passenger. Therefore, it is thought that, when a large side airbag such as that described above expands, the lower portion side of the inflating portion of the side airbag interferes with the lap side webbing.

In view of the above-described circumstances, an object of the present invention is to obtain a side airbag device for a vehicle that, in a structure that protects, by a side airbag, a wide range from the waist portion to the chest portion or the shoulder portion, the head portion of a seated passenger, can suppress or prevent a lower portion side of the inflating portion of the side airbag from interfering with a webbing for waist portion restraining of a seat belt device.

Solution to Problem

A side airbag device for a vehicle relating to a first aspect has: an inflator that is provided at a side portion of a seat back, and jets-out gas at a time of a side collision; and a side airbag that is stored in a folded-up state at a side portion of the seat back, and at which are integrally provided a waist portion protecting bag portion that, due to gas being supplied from the inflator, is expanded between a waist portion of a seated passenger and a vehicle body side portion, and a chest portion protecting bag portion that is expanded between at least a chest portion of the seated passenger and a vehicle body side portion, wherein a non-inflating portion, to which the gas is not supplied, is provided so as to extend from a peripheral edge portion of a vehicle front side of the side airbag to outer peripheral portions of the waist portion protecting bag portion and the chest portion protecting bag portion, so that a front side upper end portion of the waist portion protecting bag portion at a time of expansion is positioned at a lower side of a webbing for waist portion restraining that is strip-shaped and restrains the waist portion of the seated passenger.

In accordance with the first aspect, when there becomes the time of a side collision, the inflator that is provided at the side portion of the seat back operates, and gas is generated. The generated gas flows-in into the side airbag that is provided in a state of being folded-up at the side portion of the seat back. Therefore, the waist portion protecting bag portion of the side airbag is expanded between the waist portion of the seated passenger and a vehicle body side portion, and the chest portion protecting bag portion is expanded between at least the chest portion of the seated passenger and a vehicle body side portion. Due thereto, the waist portion and at least the chest portion of the passenger are protected from the collision load at the time of a side collision.

Here, in the present aspect, the non-inflating portion, to which gas is not supplied, is provided so as to extend from the peripheral edge portion of the vehicle front side of the side airbag to outer peripheral portions of the waist portion protecting bag portion and the chest portion protecting bag portion. Therefore, when the side airbag expands, the front end upper end portion of the waist portion protecting bag portion is positioned at the lower side of the webbing for waist portion restraining that is strip-shaped and restrains the waist portion of the seated passenger. Namely, the front end portion, that includes the front side upper end portion, of the waist portion protecting bag portion sinks beneath the webbing for waist portion restraining, and the chest portion protecting bag portion is positioned above the webbing for waist portion restraining. In other words, the waist portion protecting bag and the chest portion protecting bag are expanded separately so as to sandwich, from above and below, the webbing for waist portion restraining.

A side airbag device for a vehicle relating to a second aspect has the feature that, in the first aspect, the non-inflating portion is formed by a cloth-like member that connects, in a vehicle vertical direction, the waist portion protecting bag portion and the chest portion protecting bag portion.

In accordance with the second aspect, because the non-inflating portion is formed by a cloth-like member that connects, in the vehicle vertical direction, the waist portion protecting bag portion and the chest portion protecting bag portion, individual flapping of the waist portion protecting bag portion and the chest portion protecting bag portion is suppressed. Namely, if the waist portion protecting bag portion and the chest portion protecting bag portion are separated, it is thought that, when the side airbag expands, the chest portion protecting bag portion flaps in the vehicle transverse direction (left and right) with respect to the waist portion protecting bag portion, and the side airbag does not enter smoothly into the narrow gap between the chest portion and the like of the seated passenger and the vehicle body side portion. However, if the both are connected in the vehicle vertical direction at the non-inflating portion that is formed of a cloth-like member, flapping in the vehicle transverse direction of the chest portion protecting bag portion with respect to the waist portion protecting bag portion also is suppressed.

Further, when comparing the present aspect and a case in which gas is supplied also to a portion that corresponds to the non-inflating portion, in the present aspect, the amount of gas that is needed in order to expand the side airbag is reduced and the expansion completion time of the side airbag is shortened, more than the aforementioned case.

A side airbag device for a vehicle relating to a third aspect has the feature that, in the second aspect, the side airbag has an outer peripheral sewn portion at which a peripheral edge portion of a vehicle front side of the non-inflating portion is sewn, and a turn-in portion, that turns-in toward a vehicle rear side at an upper side of the front side upper end portion of the waist portion protecting bag portion, is provided at the outer peripheral sewn portion.

In accordance with the third aspect, the side airbag has an outer peripheral sewn portion at which the peripheral edge portion of the vehicle front side of the non-inflating portion is sewn, and further, a turn-in portion, that turns-in toward the vehicle rear side at the upper side of the front side upper end portion of the waist portion protecting bag portion, is provided at the outer peripheral sewn portion. Therefore, when the side airbag expands, the webbing for waist portion restraining easily catches on the turn-in portion (i.e., the front side upper end portion of the waist portion protecting bag portion).

A side airbag device for a vehicle relating to a fourth aspect has the feature that, in the second aspect or the third aspect, a hollowed-out portion, that is hollowed-out toward a vehicle rear side with respect to a line segment that connects, in a vehicle vertical direction, the front side upper end portion of the waist portion protecting bag portion and a front side upper end portion of the chest portion protecting bag portion, is formed at the non-inflating portion.

In accordance with the fourth aspect, the hollowed-out portion is formed at the non-inflating portion that connects the waist portion protecting bag portion and the chest portion protecting bag portion. This hollowed-out portion is structured as a portion that is hollowed-out toward the vehicle rear side with respect to a line segment that connects, in the vehicle vertical direction, the front side upper end portion of the waist portion protecting bag portion and the front side upper end portion of the chest portion protecting bag portion. Therefore, when the side airbag expands and the webbing for waist portion restraining catches on the front side upper end portion of the waist portion protecting bag portion, the front end side of the non-inflating portion in particular of the side airbag being strongly pushed by the webbing for waist portion restraining is suppressed.

Namely, in the state in which the side airbag is expanded, tension acts on the peripheral edge portion of the front end side of the non-inflating portion. Therefore, if there was no hollowed-out portion and the non-inflating portion was provided to the position of the line segment that connects, in the vehicle vertical direction, the front side upper end portion of the waist portion protecting bag portion and the front side upper end portion of the chest portion protecting bag portion, the peripheral edge portion of the front end side of that non-inflating portion would be strongly pushed by the webbing for waist portion restraining. As a result, the chest portion protecting bag portion would be pulled-in toward the vehicle lower side, and therefore, it is thought that the expanded position of the chest portion protecting bag portion would shift slightly toward the vehicle lower side.

However, when the hollowed-out portion is provided at the non-inflating portion as in the present aspect, when the front side upper end portion of the waist portion protecting bag portion enters-in beneath the webbing for waist portion restraining, the chest portion protecting bag portion being pulled-in toward the vehicle lower side due to the tension that is applied to the peripheral edge portion of the front end side of the non-inflating portion is suppressed.

A side airbag device for a vehicle relating to a fifth aspect has the feature that, in the fourth aspect, the hollowed-out portion is formed in a range that extends from the front side upper end portion of the waist portion protecting bag portion to at least a front end portion of a lower portion of the chest portion protecting bag portion.

In accordance with the fifth aspect, because the hollowed-out portion is formed in a range that extends from the front side upper end portion of the waist portion protecting bag portion to at least the front end portion of the lower portion of the chest portion protecting bag portion, the operation and effects that are obtained by the above-described fourth aspect are obtained even with respect to an adult passenger. Namely, generally, the applied height of the webbing for waist portion restraining moves toward the vehicle upper side as the physique of the seated passenger becomes larger. Therefore, if the hollowed-out portion is formed in a range that extends from the front side upper end portion of the waist portion protecting bag portion to at least the front end portion of the lower portion of the chest portion protecting bag portion, it ends up that, even when the seated passenger is an adult, the effects of the tension of the webbing for waist portion restraining are not felt as much.

A side airbag device for a vehicle relating to a sixth aspect has the feature that, in any one aspect of the first aspect through the fifth aspect, at the waist portion protecting bag portion, an outer periphery of a front side upper portion, that includes the front side upper end portion, and an outer periphery of a front side lower portion are both formed by arc-shaped curves in side view, and a radius of the outer periphery of the front side upper portion is set to be larger than a radius of the outer periphery of the front side lower portion.

In accordance with the sixth aspect, at the waist portion protecting bag portion, the outer periphery of the front side upper portion, that includes the front side upper end portion, and the outer periphery of the front side lower portion are both formed by arc-shaped curves in side view. Further, the radius of the outer periphery of the front side upper portion is set to be larger than the radius of the outer periphery of the front side lower portion. Therefore, it is easy for the front side upper portion to enter beneath the webbing for waist portion restraining. Further, at the front side lower portion, it can be made such that the contact surface area for restraining the waist portion of the seated passenger does not decrease.

Advantageous Effects of Invention

As described above, the side airbag device for a vehicle relating to the first aspect has the excellent effect that, in a structure that protects, by a side airbag, a wide range from a waist portion to a chest portion or a shoulder portion, a head portion of a seated passenger, it is suppressed or prevented that a lower portion side of the inflating portion of the side airbag interferes with a webbing for waist portion restraining of the seat belt device.

The side airbag device for a vehicle relating to the second aspect has the excellent effects of being able to, at an early stage, stabilize the expanded postures of the waist portion protecting bag portion and the chest portion protecting bag portion, and being able to aim for a reduction in cost and weight due to a reduction in the output of the inflator, and an improvement in the passenger protecting performance due to rapid expansion of the side airbag.

The side airbag device for a vehicle relating to the third aspect has the excellent effect that the accuracy of causing the front side upper end portion of the waist portion protecting bag portion to slip-in at the lower side of the webbing for waist portion restraining when the side airbag expands, can be made to be higher.

The side airbag device for a vehicle relating to the fourth aspect has the excellent effect that the performance of protecting the passenger chest portion and the like by the chest portion protecting bag portion can be maintained good.

The side airbag device for a vehicle relating to the fifth aspect has the excellent effect that, even when the seated passenger is an adult, the performance of protecting the passenger chest portion and the like by the chest portion protecting bag portion can be maintained good.

The side airbag device for a vehicle relating to the sixth aspect has the excellent effects that the accuracy of causing the front side upper end portion of the waist portion protecting bag portion to slip-in at the lower side of the webbing for waist portion restraining when the side airbag expands can be made to be even higher, and ensuring of the waist portion restraining performance can be devised.

BRIEF DESCRIPTION OF DRAWINGS

FIG. 6A is a perspective view of the side airbag showing a state in which the side airbag shown in FIG. 5 is folded in two along a central line.

FIG. 6B is a perspective view of the side airbag showing a state in which an inflator is further mounted from the state shown in FIG. 6A.

BEST MODES FOR CARRYING OUT THE INVENTION

An embodiment of a side airbag device for a vehicle relating to the present invention is described next by using FIG. 1 through FIG. 10. Note that arrow FR shown appropriately in these drawings indicates the vehicle front side, arrow UP indicates the vehicle upper side, and arrow IN indicates the vehicle transverse direction inner side.

Figure 1:
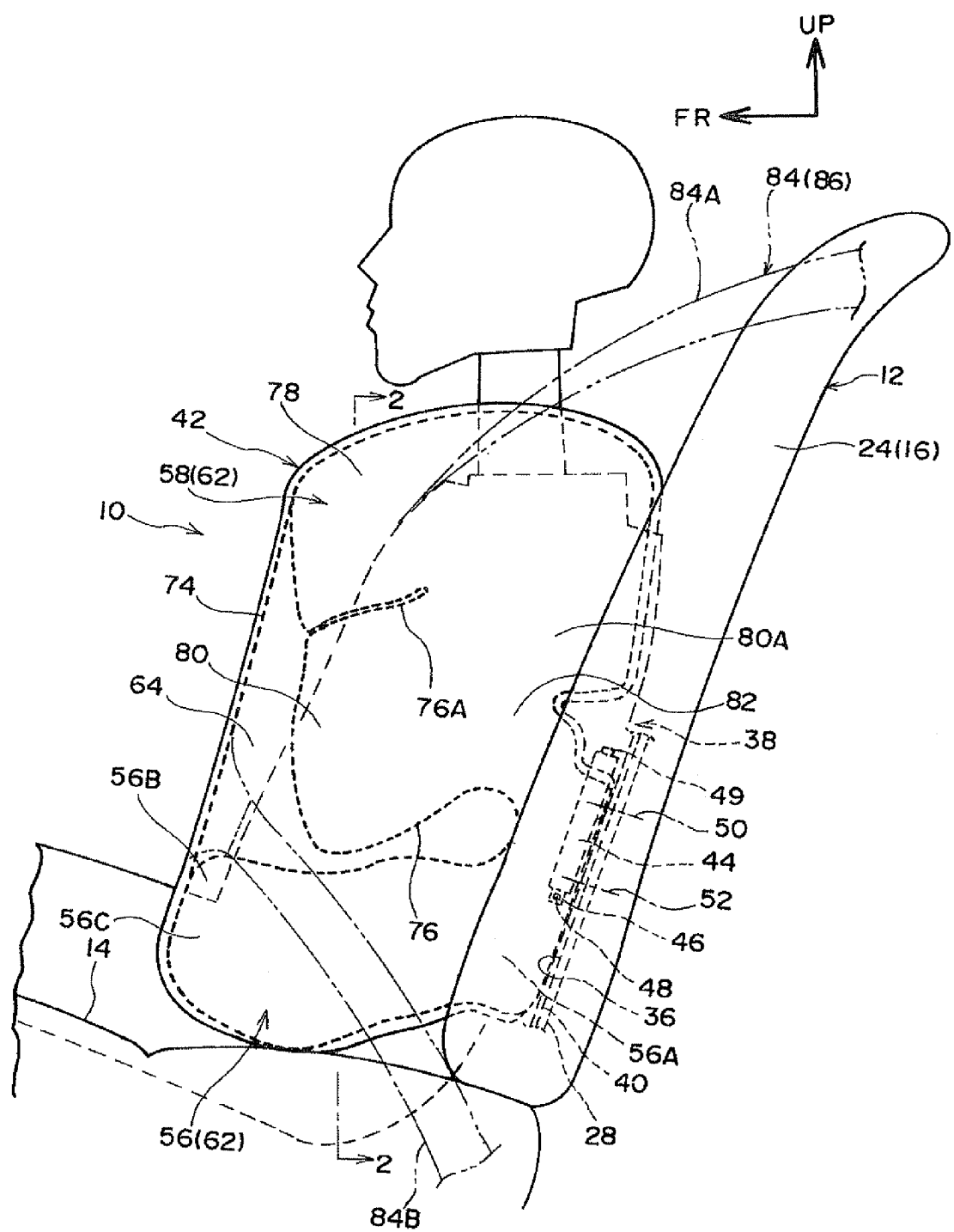
FIG. 1 is a side view showing, as seen from a vehicle side, a state in which a side airbag device for a rear seat relating to the present embodiment is operated.
Figure 4:
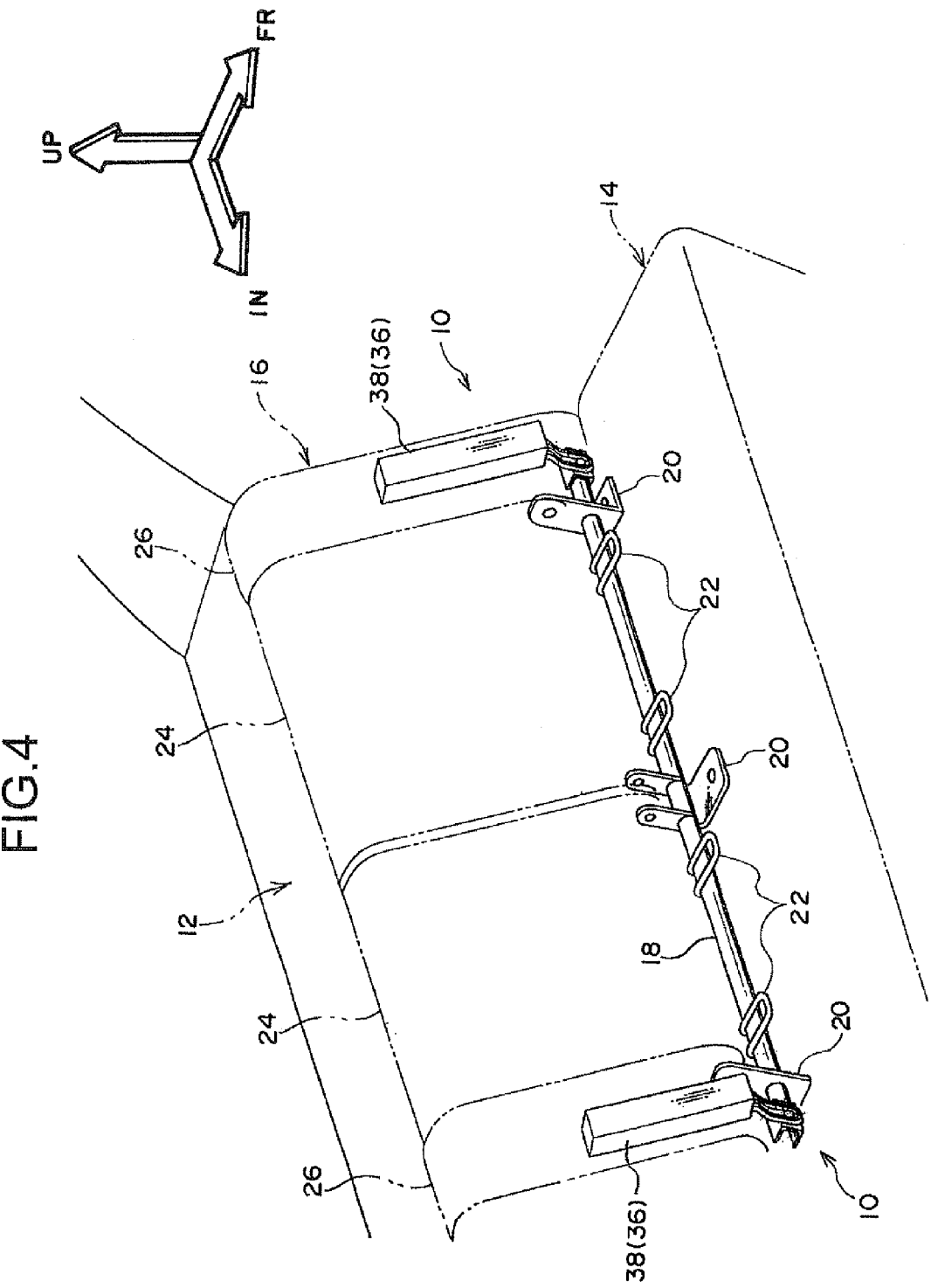
FIG. 4 is a perspective view showing the overall structure of the rear seat shown in FIG. 1.

As shown in FIG. 1 and FIG. 4, a rear seat 12, to which is applied a side airbag device 10 for a rear seat that serves as a side airbag device for a vehicle relating to the present embodiment, has a rear seat cushion 14 that supports the buttocks and thigh portions of a passenger, and a rear seat back 16 that supports the waist portion and back portion of the passenger. Note that, depending on the type of vehicle, a headrest is provided at the upper end portion of the rear seat back 16.

A child seat fixing member 18, that corresponds to the ISOFix (standards in which an International Organization For Standardization has unified the size and attachment method of a fixing device) system is disposed at the lower side of the lower end portion of the rear seat back 16. This child seat fixing member 18 is formed by a high-strength, highly-rigid pipe material, and is disposed in a state in which the longitudinal direction thereof runs along the vehicle transverse direction. Mounting brackets 20, for mounting this child seat fixing member 18 to an unillustrated rear floor, are respectively fixed by welding or the like to the longitudinal direction both end portions and the longitudinal direction intermediate portion of the child seat fixing member 18. Moreover, plural strikers 22, for corresponding to the ISOFix system, are fastened in advance by welding or the like to the child seat fixing member 18.

On the other hand, the above-described rear seat back 16 is a split-folding rear seat back, and has a pair of left and right main body portions 24 that can tilt with respect to the rear floor, and a pair of left and right side support portions 26 that are disposed at the vehicle transverse direction outer sides (the vehicle door sides) with respect to these main body portions 24.

The pair of left and right main body portions 24 each have an unillustrated seat frame that is made of metal. The lower end portions of the respective seat frames are connected to the upper end portions of the mounting brackets 20, so as to be able to rotate around an axis that runs along the vehicle transverse direction. Due thereto, the rear seat back 16 can be tilted toward the rear seat cushion 14 side. Note that, at usual times, the main body portions 24 and back panels, that are not illustrated and are vehicle body side structural members, are separatably connected by locking mechanisms (not shown) that are disposed at the reverse sides of the both side portions of the respective main body portions 24.

On the other hand, the pair of left and right side support portions 26 each have a seat frame 28 (only a portion of which is shown in FIG. 1) that is made of resin. The seat frame 28 is long in the seat back height direction, and the plan sectional shape thereof is a substantial U-shape whose vehicle rear side is open.

As shown in FIG. 1, a concave portion (airbag module mounting portion) 36, that is concave in a substantially parallelepiped shape toward the vehicle rear side, is formed in the substantially central portion of the above-described seat frame 28. An airbag module 38, that structures a main portion of the side airbag device 10 for a rear seat, is mounted within this concave portion 36. The airbag module 38 has a module case 40 that is made of metal and is fit-into the concave portion 36 interior, a side airbag 42 that is stored in a folded-up state within this module case 40, an inflator 44 that is cylindrical and is a gas generating means that generates gas within the side airbag 42 at the time of a side collision, and an unillustrated diffuser that is a flow adjusting means that envelops this inflator 44. The module case 40 is formed in a substantial box shape that is vertically long and whose vehicle front side is open.

The side airbag 42 is folded-up by a predetermined way of folding-up (in the present embodiment, bellows-folding), and is covered by an unillustrated wrapping material, and the shape thereof is maintained. This wrapping material ruptures easily at the time of inflation and expansion of the side airbag 42. Note that, generally, roll-folding and bellows-folding are ways of folding-up the airbag, and, in the present embodiment, the side airbag 42 is folded-up by bellows-folding in which the folding easily comes undone. However, the side airbag 42 may be folded-up by roll-folding, or may be folded-up by combining roll-folding and bellows-folding.

On the other hand, the inflator 44 and the diffuser are disposed within the side airbag 42 that is folded-up. The inflator 44 is disposed with the longitudinal direction thereof being the vertical direction of the side support portion 26 (the seat back height direction), and a gas jetting-out portion 48, in which plural gas jetting-out holes 46 are formed, is formed to project-out at one longitudinal direction end portion (here, the lower end portion). Further, a squib 49 that is an igniting device and an igniting agent are disposed at the other end portion in the longitudinal direction (here, the upper end portion) of the inflator 44. An airbag ECU, that is disposed beneath the console box or the like, is electrically connected to the squib 49, and a side collision sensor, that is disposed at a side portion of the vehicle body, is electrically connected to this airbag ECU. When this side collision sensor senses a state of a side collision of the vehicle, the side collision sensor outputs a sensing signal to the airbag ECU. At the airbag ECU, it is judged whether or not to operate the side airbag 42, and, when operation of the side airbag is judged, a predetermined current is supplied to the squib 49 and the igniting agent is ignited. Due thereto, gas is jetted-out from the plural gas jetting-out holes 46 that are provided at the inflator 44. Note that a high pressure gas filled type inflator can be used instead of the gas generating material filled type inflator 44.

The above-described inflator 44 is covered by the unillustrated diffuser that functions as a flow adjusting means. The diffuser adjusts the flow of the gas that is jetted-out from the inflator 44, and thereafter, supplies the gas to the side airbag 42 interior.

A pair of upper and lower stud bolts 50, 52 (see FIG. 1) stand at this diffuser. The stud bolt 50 at the upper side passes-through the side airbag 42, the bottom wall portion of the module case 40, and the bottom wall portion of the concave portion 36, and the distal end side is screwed-together with a nut. Due thereto, the upper portion side of the diffuser is fastened and fixed, together with the module case 40, to the seat frame 28, and the side airbag 42 is nipped between the diffuser and the bottom wall portion of the module case 40. Further, the airbag module 38 is fastened and fixed to the seat frame 28, at a region at the height at which the inflator 44 is disposed.

On the other hand, the stud bolt 52 at the lower side that is provided at the diffuser passes through the side airbag 42 and the bottom wall portion of the module case 40, and the distal end side is screwed-together with a nut. Due thereto, the lower portion side of the diffuser is fastened and fixed to the module case 40, and the side airbag 42 is nipped between the diffuser and the floor wall portion of the module case 40.

Figure 3:
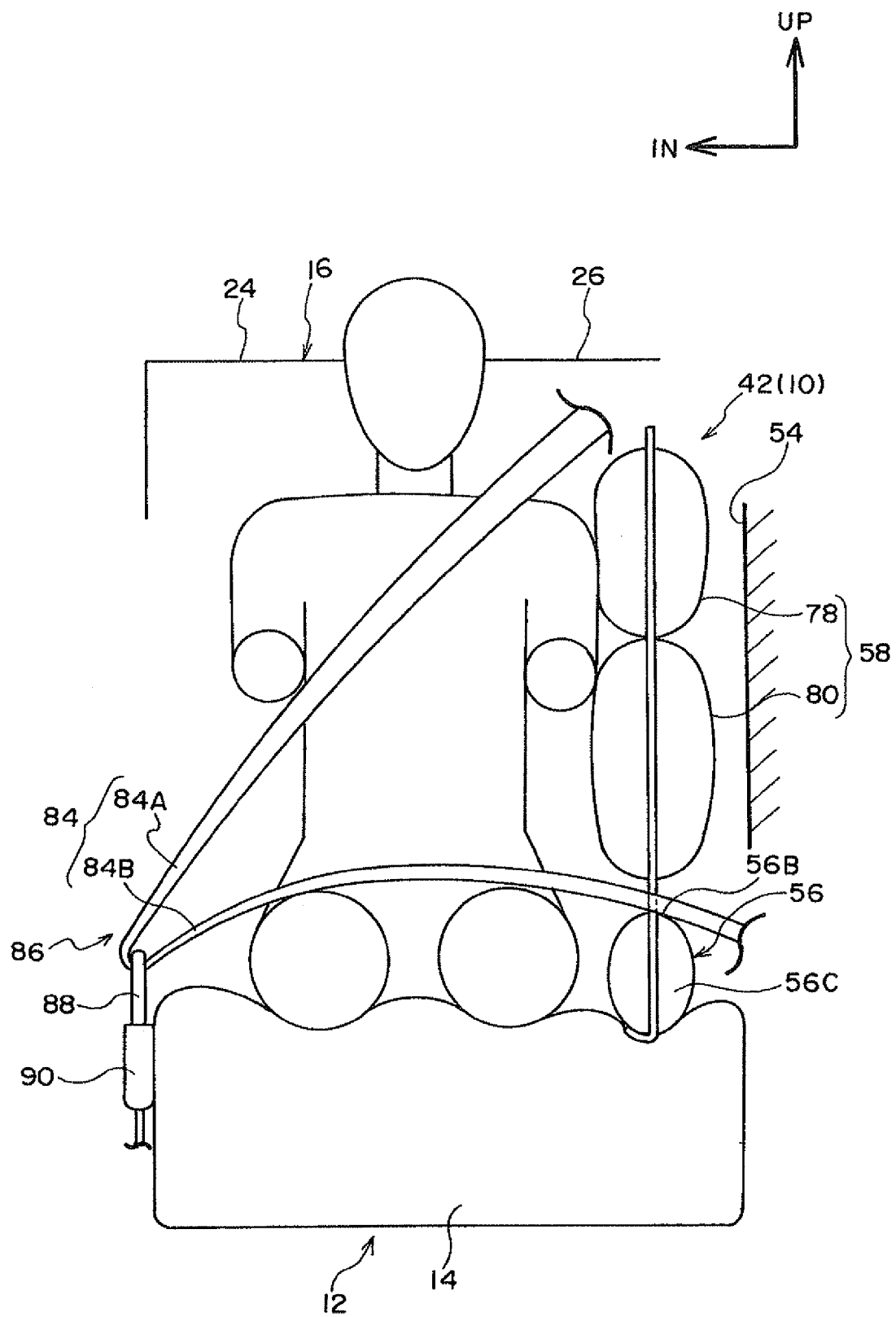
FIG. 3 is a front view showing, as seen from a vehicle front side, a state in which the side airbag device for a rear seat has operated in a webbing applied state of a passenger seated in a rear seat shown in FIG. 1.

The above-described side airbag 42 is described in detail here. As shown in FIG. 1 and FIG. 3, the side airbag 42 is structured so as to integrally have a waist portion protecting bag portion 56 that is expanded between the waist portion of the seated passenger and a door trim 54 (see FIG. 3) of a rear side door that is a vehicle body side portion, and a chest portion/shoulder portion protecting bag portion 58 that serves as a chest portion protecting bag and that is expanded between the chest portion and the shoulder portion of the seated passenger and the door trim 54 of the rear side door that is a vehicle body side portion. Therefore, the side airbag 42 of the present embodiment is structured as side airbag that is large in the vehicle vertical direction.

Figure 5:
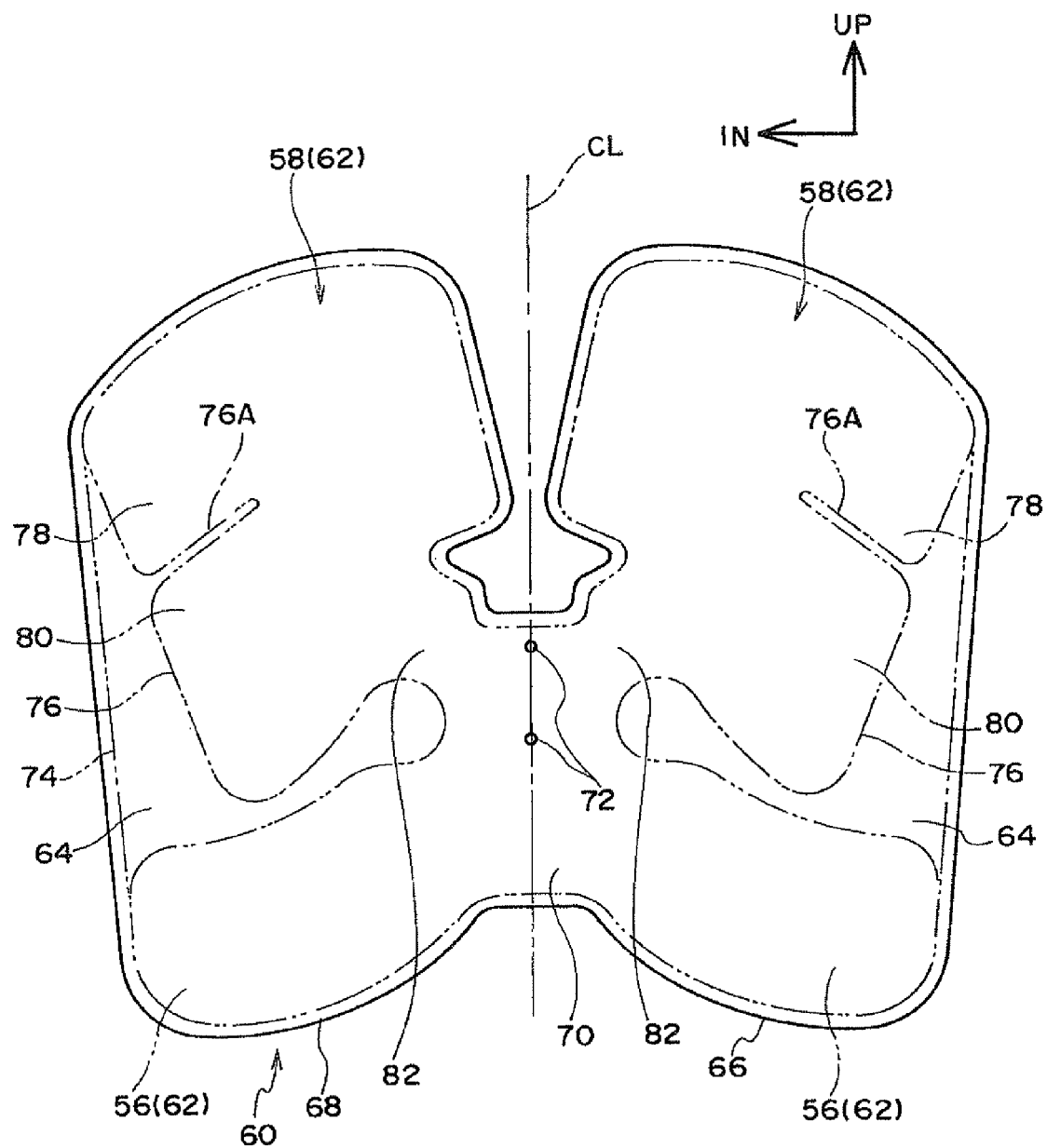
FIG. 5 is a front view of a base cloth, showing a plan unfolded state before sewing of the side airbag shown in FIG. 1.

To describe more specifically, a bag base cloth 60 of the side airbag 42 is shown in a plan unfolded state in FIG. 5. As shown in this drawing, the bag base cloth 60 of the side airbag 42 is structured by a left side base cloth 66 and a right side base cloth 68 that are shaped symmetrically to the left and the right and each of which is cut in a substantially rectangular shape and at which an inflating portion 62 and a non-inflating portion 64 are formed (note that the left and right of the left side base cloth 66 and the right side base cloth 68 are prescribed in a state in which a passenger who is seated at the left side of the rear seat 12 is facing forward), and a central side base cloth 70 that connects the left side base cloth 66 and the right side base cloth 68 at the lower portion side. A pair of bolt insert-through holes 72 are formed in the central side base cloth 70 with an interval therebetween vertically. The stud bolts 50, 52 that stand from the diffuser are inserted respectively into these bolt insert-through holes 72 (see FIG. 6B).

In a state in which the side airbag 42 is folded in two with the folding line being a central line CL that passes through the pair of upper and lower bolt insert-through holes 72 that are formed in the central side base cloth 70 as shown in FIG. 5, the side airbag 42 is sewn along an outer peripheral sewn portion 74, that is illustrated by the two-dot chain line, as shown in FIG. 6A. Moreover, the side airbag 42 is sewn along an inner side sewn portion 76, that is shown by the two-dot chain line, along the outer shapes of the waist portion protecting bag portion 56 and the chest portion/shoulder portion protecting bag portion 58. Due thereto, as shown in FIG. 6B, the inflating portion 62, that is formed from the waist portion protecting bag portion 56 and the chest portion/shoulder portion protecting bag portion 58, is formed, and the non-inflating portion 64, that is substantially L-shaped and is surrounded by the outer peripheral sewn portion 74 and the inner side sewn portion 76, is formed. The non-inflating portions 64 is structured as a portion of two cloths that is formed by the left side base cloth 66 and the right side base cloth 68 being overlapped. The gas that is jetted-out from the inflator is not supplied to this non-inflating portion 64. Further, the waist portion protecting bag portion 56 and the chest portion/shoulder portion protecting bag portion 58 are connected in the vehicle vertical direction by the non-inflating portion 64.

Figure 2:
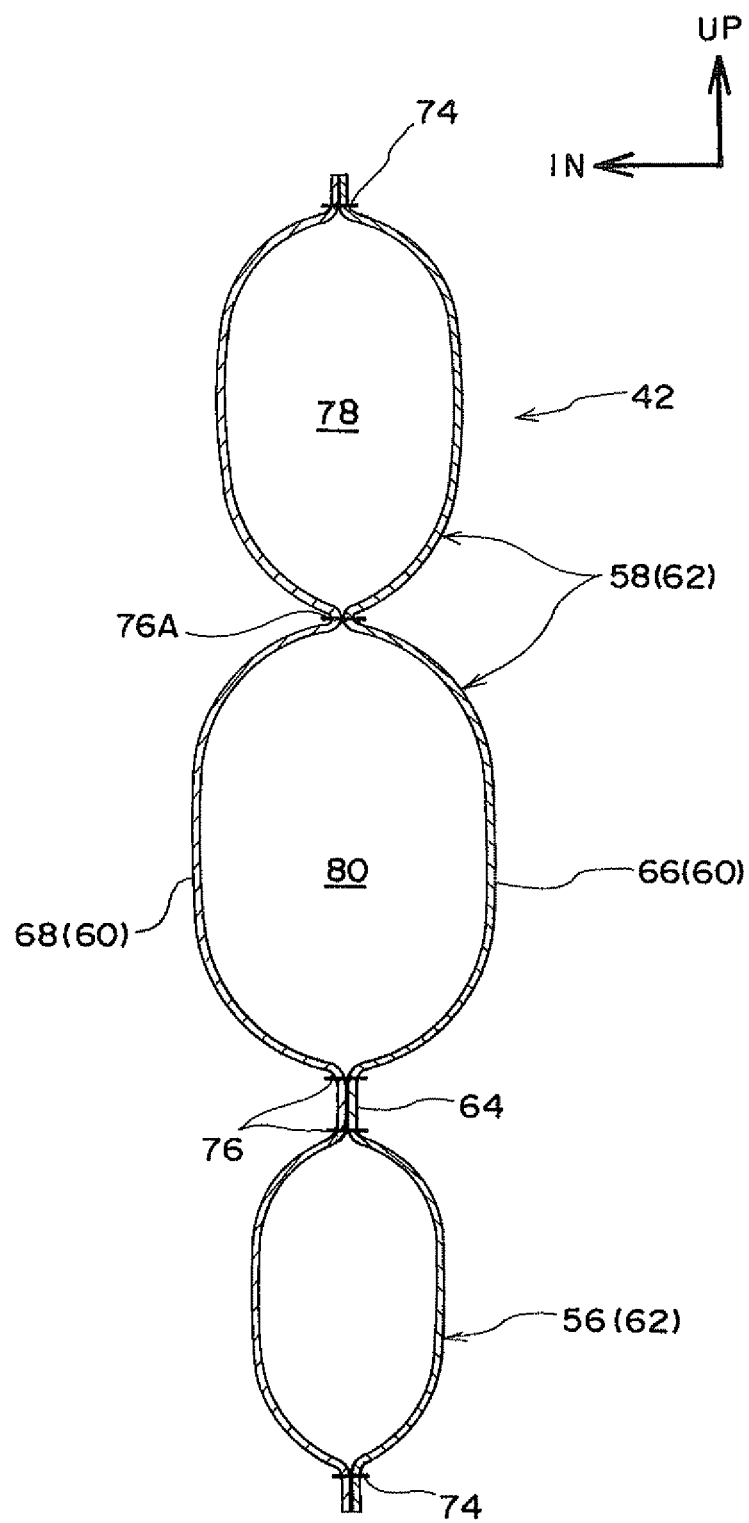
FIG. 2 is an enlarged longitudinal sectional drawing of a side airbag showing a state in which the side airbag shown in FIG. 1 is cut along line 2-2.

On the other hand, because a portion 76A of the inner side sewn portion 76 is set also at the height direction intermediate portion of the chest portion/shoulder portion protecting bag portion 58 that structures the upper portion side of the inflating portion 62, the vehicle front side portion of the chest portion/shoulder portion protecting bag portion 58 is a top-bottom two-level chamber structure that is formed from an upper side chamber 78 and a lower side chamber 80 (see FIG. 2). Further, as shown in FIG. 1, in side view, the waist portion protecting bag portion 56 is formed to be longer at the vehicle front side than the chest portion/shoulder portion protecting bag portion 58. Moreover, a root portion 80A of the lower side chamber 80 of the chest portion/shoulder portion protecting bag portion 58, and a root portion 56A of the waist portion protecting bag portion 56, communicate with one another by a communicating portion 82 that is formed at the vehicle front side of the inflator 44. The gas jetting-out portion 48 of the inflator 44 is directed toward the vehicle lower side, and gas is supplied more promptly to the waist portion protecting bag portion 56 than the chest portion/shoulder portion protecting bag portion 58.

Further, a three-point-type seat belt device 86, that has a webbing 84 for restraining a passenger, is disposed at the rear seat 12. The seat belt device 86 has the webbing 84 that is formed from a shoulder side webbing 84A that spans in a sash shape over the front surface of the chest portion of the seated passenger and restrains the chest portion of the seated passenger, and a lap side webbing 84B that serves as a webbing for waist portion restraining and that spans over the front surface of the abdomen portion lower side of the seated passenger and restrains the waist portion of the seated passenger. One end portion of the webbing 84 is anchored on the take-up shaft of an unillustrated retractor for a rear seat that is disposed at the rear of the rear seat 12, and the other end portion is anchored to an unillustrated anchor plate that is fixed to the rear floor. Further, as shown in FIG. 3, a tongue plate 88 is inserted-through the intermediate portion of the webbing 84.

The applied state of the three-point-type seat belt device 86 can be attained by engaging the tongue plate with a buckle device 90.

Moreover, in the present embodiment, the non-inflating portion 64 to which gas is not supplied is provided so as to extend from the vehicle front side peripheral edge portion of the side airbag 42 to the outer peripheral portions of the waist portion protecting bag portion 56 and the chest portion/shoulder portion protecting bag portion 58, such that a front side upper end portion 56B of the waist portion protecting bag portion 56 at the time of expansion is positioned at the lower side of the lap side webbing 84B that restrains the waist portion of the seated passenger. In other words, at the time of expansion of the side airbag 42, the non-inflating portion 64, that is formed in a substantial L-shape in side view, is set at a position that does not interfere with the lap side webbing 84B, and due thereto, the front side upper end portion 56B of the waist portion protecting bag portion 56 slips-in at the lower side of the lap side webbing 84B, and the chest portion/shoulder portion protecting bag portion 58 is disposed at the upper side of the lap side webbing 84B.

The operation and effects of the present embodiment are described next. In the side airbag device 10 for a rear seat relating to the present embodiment, when the vehicle is involved in a side collision, the state of a side collision is sensed by the unillustrated side collision sensor that is disposed at a vehicle body side portion, such as the center pillar or the rear pillar or the like. Then, a sensing signal is outputted from the side collision sensor to the airbag ECU, and operation of the side airbag device 10 for a rear seat is judged by the airbag ECU. Therefore, the inflator 44 is operated by the airbag ECU. Namely, a predetermined current is supplied to the squib 49 of the inflator 44. Due thereto, a large amount of gas is generated from the inflator 44, and the side airbag 42, that is stored in a folded-up state within the module case 40, is inflated. The inflation pressure of the side airbag 42 acts on the sewn portion of the outer skin of the side support portion 26 via an unillustrated stay cloth, and that sewn portion that prescribes the burst line is ruptured. Due thereto, an opening is formed in the front surface side of the side support portion 26, and, as shown in FIG. 1, FIG. 3 and FIG. 6B, the side airbag 42 is inflated and expanded between the side portion of the upper body of the seated passenger and the door trim 54 of the rear side door. Concretely, the bag portion 56 for waist portion protecting is expanded between the waist portion of the seated passenger and the door trim 54. Further, the chest portion/shoulder portion protecting bag portion 58 is expanded between the door trim 54 and the chest portion and the shoulder portion of the seated passenger. As a result, the passenger is protected by the side airbag 42 from the impact at the time of the side collision.

Here, in the present embodiment, as described above, due to the non-inflating portion 64 being set so as to overlap the lap side webbing 84B that restrains the waist portion of the seated passenger, the front side upper end portion 56B of the waist portion protecting bag portion 56 at the time of expansion is positioned further toward the lower side than the lap side webbing 84B. Therefore, as shown in FIG. 1 and FIG. 3, (a front end portion 56C that includes the front side upper end portion 56B of) the waist portion protecting bag portion 56 sinks beneath the lap side webbing 84B, and the chest portion protecting bag portion 58 is positioned above the lap side webbing 84B. In other words, the waist portion protecting bag 56 and the chest portion protecting bag 58 are expanded separately so as to sandwich the lap side webbing 84B from above and below.

As a result, in a structure in which a wide range from the waist portion to the chest portion and the shoulder portion of a seated passenger is protected by the large side airbag 42, the side airbag device 10 for a rear seat relating to the present embodiment can suppress or prevent the lower portion side of the inflating portion of the side airbag 42 (the waist portion protecting bag portion 56) interfering with the lap side webbing 84B of the seat belt device 86.

Further, in the present embodiment, because the waist portion protecting bag portion 56 and the chest portion/shoulder portion protecting bag portion 58 are connected in the vehicle vertical direction by the non-inflating portion 64 that is structured by a cloth-like member, individual flapping of the waist portion protecting bag portion 56 and the chest portion/shoulder portion protecting bag portion 58 is suppressed. Namely, if the waist portion protecting bag portion 56 and the chest portion/shoulder portion protecting bag portion 58 are separated, it is thought that, when the side airbag 42 expands, the chest portion/shoulder portion protecting bag portion 58 flaps (swings) in the vehicle transverse direction (left and right) with respect to the waist portion protecting bag portion 56, and the side airbag 42 does not enter smoothly into the narrow gap between the chest portion/shoulder portion of the seated passenger and the door trim 54. However, if the both are connected in the vehicle vertical direction at the non-inflating portion 64, flapping (swinging) in the vehicle transverse direction of the chest portion/shoulder portion protecting bag portion 58 with respect to the waist portion protecting bag portion 56 also is suppressed.

Further, when comparing the present embodiment and a case in which gas is supplied also to a portion that corresponds to the non-inflating portion 64, in the present embodiment, the amount of gas that is needed in order to expand the side airbag 42 is reduced and the expansion completion time of the side airbag 42 is shortened, more than the aforementioned case.

Due to the above, the side airbag device 10 for a rear seat relating to the present embodiment can, at an early stage, stabilize the expanded postures of the waist portion protecting bag portion 56 and the chest portion/shoulder portion protecting bag portion 58, and can aim for a reduction in cost and weight due to the reduction in the output of the inflator 44, and an improvement in the passenger protecting performance due to the rapid expansion of the side airbag 42.

Several modified examples are described next.

First Modified Example

Figure 7:
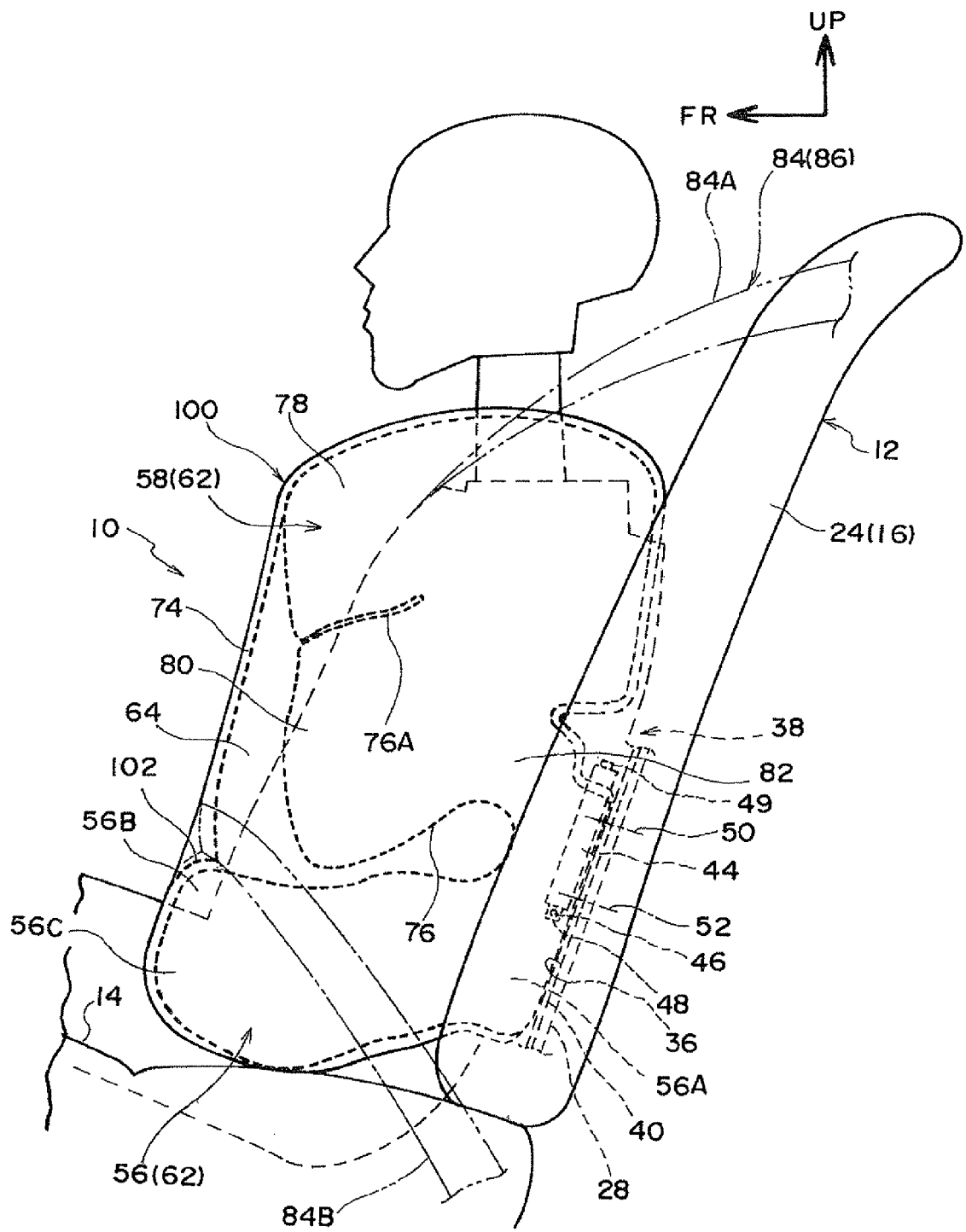
FIG. 7 is a side view corresponding to FIG. 1 and showing a first modified example of the side airbag shown in FIG. 1.

In a side airbag 100 shown in FIG. 7, there is the feature in the point that a turn-in portion 102, that turns-in toward the vehicle rear side at the upper side of the front side upper end portion 56B of the waist portion protecting bag portion 56, is provided at a portion of the outer peripheral sewn portion 74 that passes along the peripheral edge portion at the vehicle front side of the non-inflating portion 64.

In accordance with the above-described structure, at the time of expansion of the side airbag 100, it is easy for the lap side webbing 84B of the webbing 84 for waist portion restraining to catch on the turn-in portion 102 (i.e., the front side upper end portion 56B of the waist portion protecting bag portion 56). Accordingly, when the side airbag 100 expands, the accuracy of causing the front side upper end portion 56B of the waist portion protecting bag portion 56 to slip-in at the lower side of the lap side webbing 84B can be made to be higher.

Second Modified Example

Figure 8:
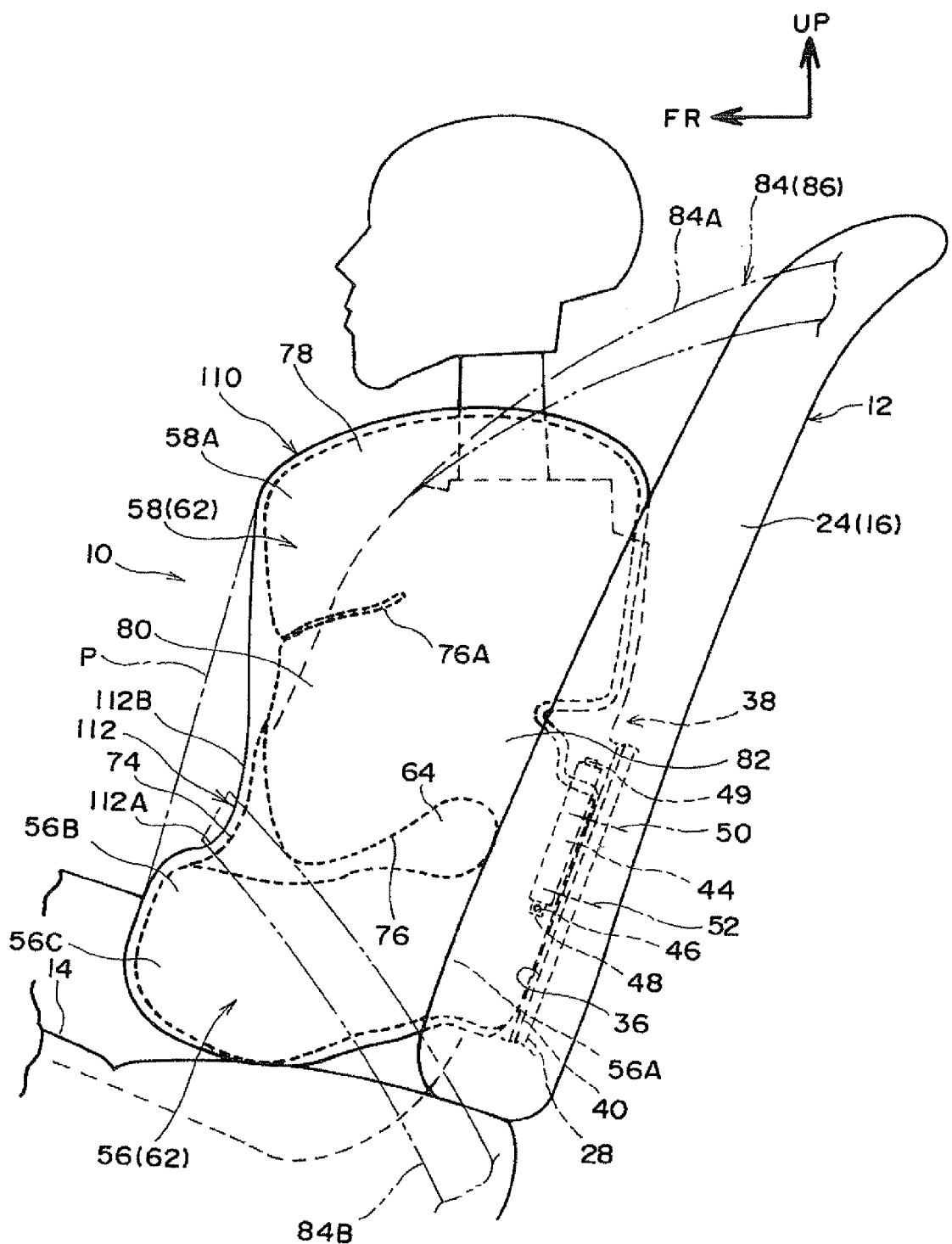
FIG. 8 is a side view corresponding to FIG. 1 and showing a second modified example of the side airbag shown in FIG. 1.

In a side airbag 110 shown in FIG. 8, the above-described turn-in portion 102 is further developed. Concretely, there is the feature in the point that a hollowed-out portion 112, that is hollowed-out toward the vehicle rear side with respect to a line segment P that connects, in the vehicle vertical direction, the front side upper end portion 56B of the waist portion protecting bag portion 56 and a front side upper end portion 58A of the chest portion/shoulder portion protecting bag portion 58, is formed at the non-inflating portion 64 of the side airbag 110. The hollowed-out portion 112 is formed in a bow-shape in side view. A lower end portion 112A of the hollowed-out portion 112 is a shape that turns-in along the upper edge of the waist portion protecting bag portion 56, more greatly than the above-described turn-in portion 102. Further, an intermediate portion 112B in the height direction of the hollowed-out portion 112 is disposed in a vicinity of the front end portion (more concretely, substantially the height direction intermediate portion of the front end portion) of the lower side chamber 80 that structures the lower portion of the chest portion/shoulder portion protecting bag portion 58. Namely, of the hollowed-out portion 112, the portion that is hollowed-out deeply is not only the lower end portion 112A, but also is expanded toward the vehicle upper side to a range that extends to the intermediate portion 112E in the height direction. Due thereto, the hollowed-out portion 112 on the whole is formed in a range that extends from the front side upper end portion 56B of the waist portion protecting bag portion 56 via a vicinity of the front end portion of the lower side chamber 80 and to the front end portion of the upper side chamber 78.

In accordance with the above-described structure, when the side airbag 110 expands and the lap side webbing 84B catches on the front side upper end portion 56B of the waist portion protecting bag portion 56, the front end side of the non-inflating portion 64 in particular of the side airbag 110 being strongly pushed by the lap side webbing 84B is suppressed.

Namely, in the state in which the side airbag 110 is expanded, tension is applied to the peripheral edge portion of the front end side of the non-inflating portion 64. Therefore, if there was no hollowed-out portion 112 and the non-inflating portion was provided to the position of the line segment P that connects, in the vehicle vertical direction, the front side upper end portion 56B of the waist portion protecting bag portion 56 and the front side upper end portion 58A of the chest portion/shoulder portion protecting bag portion 58 (i.e., in the case of the side airbag 42 shown in FIG. 1), the peripheral edge portion of the front end side of that non-inflating portion would be strongly pushed by the lap side webbing 84B. As a result, the chest portion/shoulder portion protecting bag portion 58 would be pulled-in toward the vehicle lower side, and therefore, it is thought that the expanded position of the chest portion/shoulder portion protecting bag portion 58 would shift slightly toward the vehicle lower side.

However, when the hollowed-out portion 112 is provided at the non-inflating portion 64 as in this structure, when the front side upper end portion 56B of the waist portion protecting bag portion 56 enters-in beneath the lap side webbing 84B, the chest portion/shoulder portion protecting bag portion 58 being pulled-in toward the vehicle lower side due to the tension that is applied to the peripheral edge portion of the front end side of the non-inflating portion 64 is suppressed. As a result, in accordance with the above-described structure, the performance of protecting the passenger chest portion and shoulder portion by the chest portion/protecting bag portion 58 can be maintained good.

Moreover, because the hollowed-out portion 112 is formed in a range that extends from the front side upper end portion 56B of the waist portion protecting bag portion 56 to at least the front end portion of the lower portion (the lower side chamber 80) of the chest portion/shoulder portion protecting bag portion 58, the operation and effects obtained by providing the above-described turn-in portion 102 are obtained with respect to an adult passenger as well. Namely, generally, the applied height of the lap side webbing 84B moves toward the vehicle upper side as the physique of the seated passenger becomes larger. Therefore, if the hollowed-out portion 112 is formed in a range that extends from the front side upper end portion 56B of the waist portion protecting bag portion 56 to at least the front end portion of the lower portion (the lower side chamber 80) of the chest portion/shoulder portion protecting bag portion 58, it ends up that, even when the seated passenger is an adult, the effects of the tension of the lap side webbing 84B are not felt as much. As a result, in accordance with the above-described structure, even when the seated passenger is an adult, the performance of protecting the passenger chest portion and shoulder portion and the like by the chest portion/shoulder portion protecting bag portion 58 can be maintained good.

Third Modified Example

Figure 9:
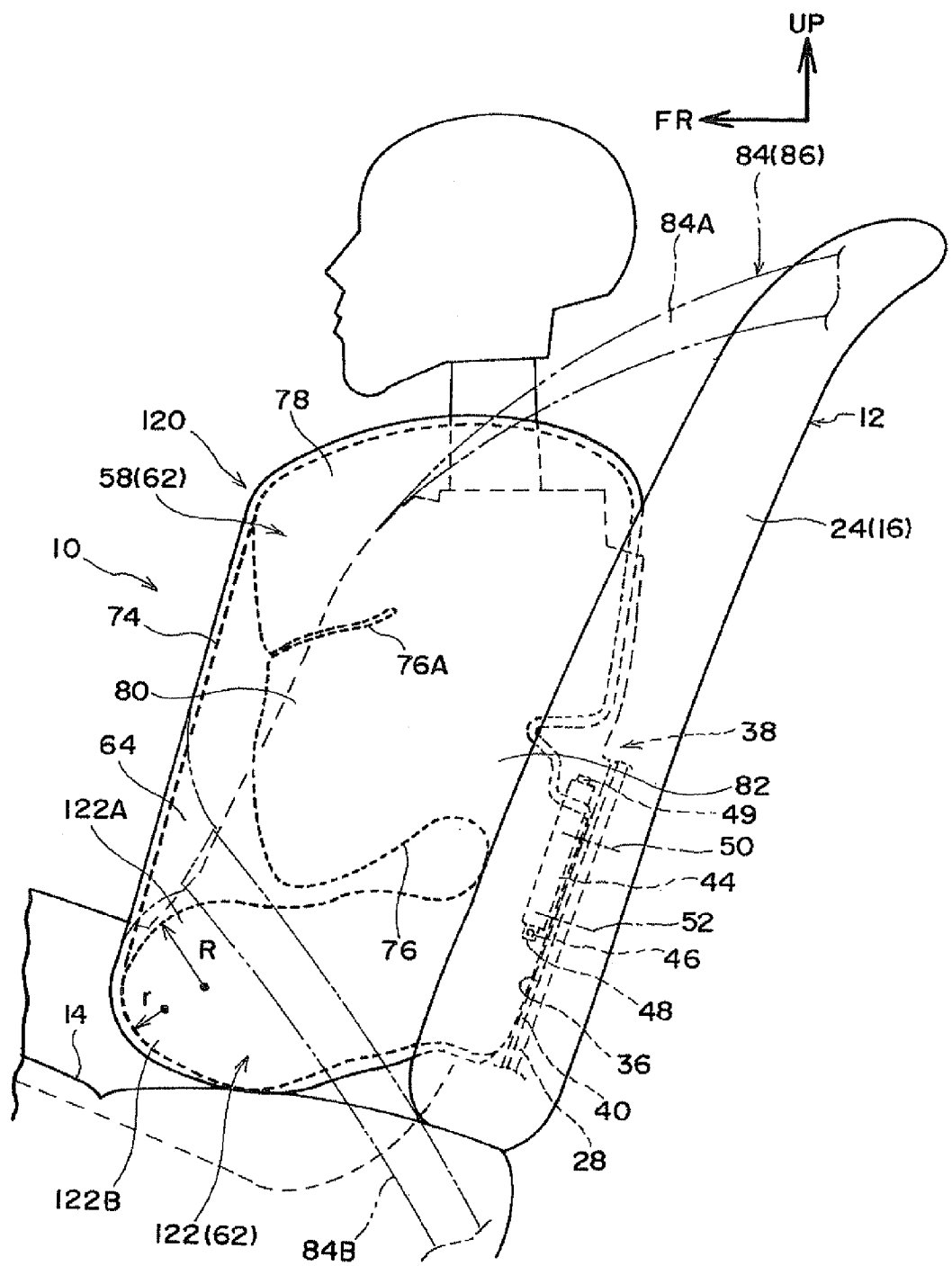
FIG. 9 is a side view corresponding to FIG. 1 and showing a third modified example of the side airbag shown in FIG. 1.

In a side airbag 120 shown in FIG. 9, a waist portion protecting bag portion 122 is used in which the outer periphery of a front side upper portion 122A, that includes a region corresponding to the above-described front side upper end portion 56B, and the outer periphery of a front side lower portion 122B are both formed by arc-shaped curves. Moreover, a radius R of the outer periphery of the front side upper portion 122A is set to be larger than a radius r of the outer periphery of the front side lower portion 122B.

In accordance with the above-described structure, both the outer periphery of the front side upper portion 122A, that includes a region corresponding to the front side upper end portion 56B, and the outer periphery of the front side lower portion 122B are formed by arc-shaped curves, and further, the radius R of the outer periphery of the front side upper portion 122A is set to be larger than the radius r of the outer periphery of the front side lower portion 122B. Therefore, it is easy for the front side upper portion 122B to enter beneath the lap side webbing 84B. Further, at the front side lower portion 122B, it can be made such that the contact surface area for restraining the waist portion of the seated passenger does not decrease. As a result, the accuracy of causing the front side upper end portion of the waist portion protecting bag portion 122 to slip-in at the lower side of the lap side webbing 84B when the side airbag 120 expands, can be made to be even higher, and ensuring of the waist portion restraining performance can be devised.

Fourth Modified Example

Figure 10:
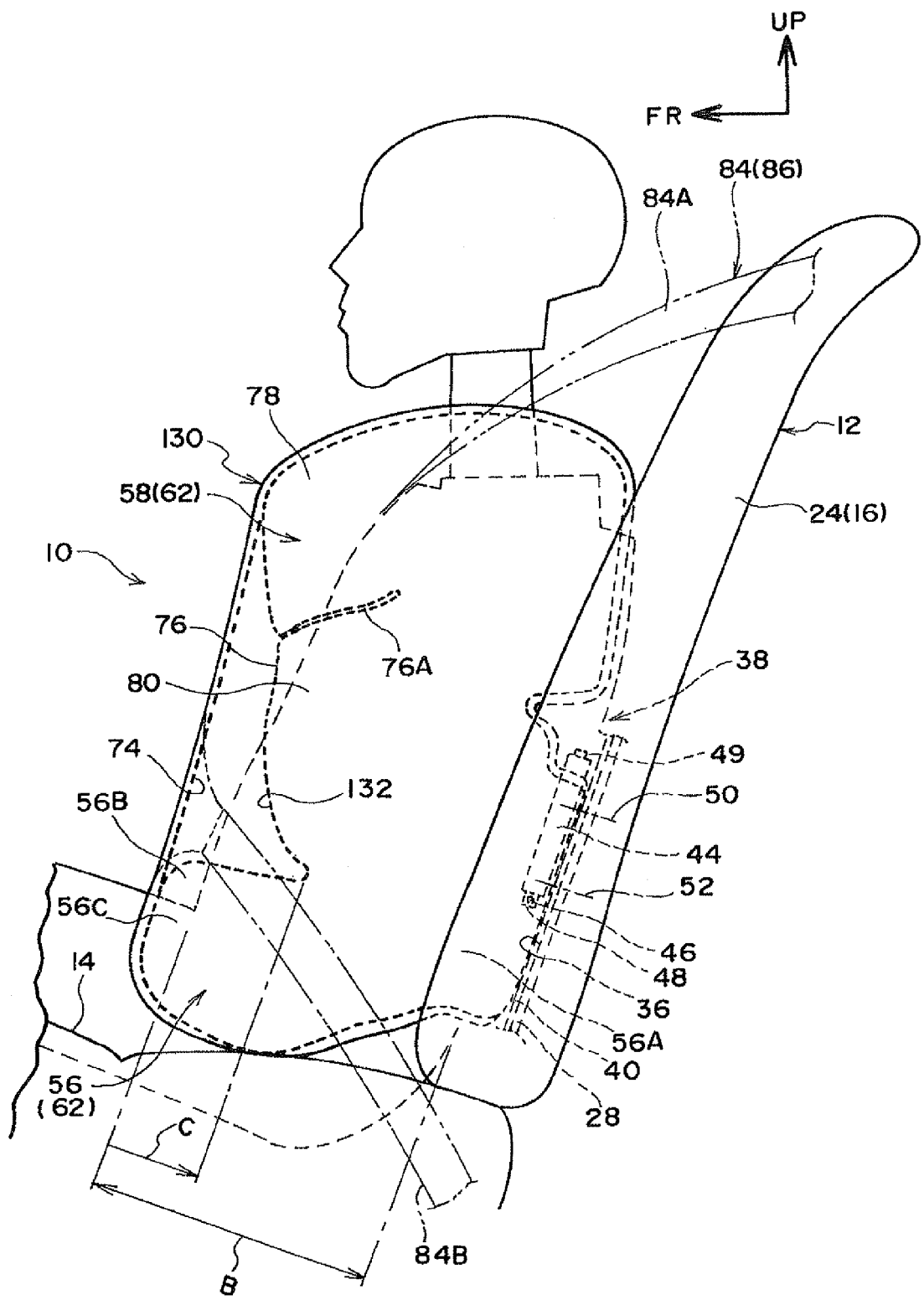
FIG. 10 is a side view corresponding to FIG. 1 and showing a fourth modified example of the side airbag shown in FIG. 1.

In a side airbag 130 shown in FIG. 10, there is the feature in the point that a width C of a hollowed-out portion 132 is prescribed by the relationship with a physique width B of the seated passenger. Concretely, given that the physique width of the seated passenger is B, FIG. 10 shows that it suffices for the hollowed-out portion 132 to be formed to a depth that is at least (B×⅓) from the front surface of the abdomen portion of that seated passenger. Accordingly, in this case, the side airbag 130 is a shape in which the waist portion protecting bag portion 56 and the chest portion/shoulder portion protecting bag portion 58 communicate directly in the vehicle vertical direction. In other words, the above-described communicating portion 82 is a form that has been extinguished.

In accordance with the above-described structure, given that the physique width of the seated passenger is B, usually, the lap side webbing 84B is not applied more than ⅓ from the front surface of the abdomen portion. Accordingly, if the hollowed-out portion 132 is formed at at least ⅓ or more of the physique width B, the expanding of the waist portion protecting bag portion 56 is not obstructed, and the waist portion protecting bag portion 56 can be made to sink beneath the lap side webbing 84B.

Supplementary Explanation of Above-Described Embodiment (1) In the above-described embodiment, the side airbag device for a vehicle relating to the present invention is applied to the side airbag device 10 for a rear seat, but is not limited to this. The present invention can also be applied to a side airbag device for a front seat.
(2) The above-described embodiment describes, as an example, an aspect in which the side airbag 42 and the like are formed by folding-over the single bag base cloth 60 at the center CL of the central side base cloth 70 and successively sewing, but is not limited to this. Two bag base cloths may be cut in advance, and the both may be superposed, and the outer peripheral protons or the like may be sewn.
(3) The above-described embodiment describes, as an example, an aspect in which the side airbag 42 or the like is provided with, in addition to the waist portion protecting bag portion 56, the chest portion/shoulder portion protecting bag portion 58 and the like, but is not limited to this. It suffices for there to be at least a chest portion protecting bag portion that protects a chest portion, and, for example, the present invention may be applied to a large side airbag that protects from the chest portion to the head portion.

The invention claimed is:

1. A side airbag device for a vehicle, the side airbag device comprising:
an inflator that is provided at a side portion of a seat back, and jets-out gas at a time of a side collision; and
a side airbag that is stored in a folded-up state at the side portion of the seat back, and at which are integrally provided a waist portion protecting bag portion that, due to gas being supplied from the inflator, is expanded between a waist portion of a seated passenger and a vehicle body side portion, and a chest portion protecting bag portion that is expanded between at least a chest portion of the seated passenger and the vehicle body side portion, wherein
the side airbag is formed in a substantially rectangular shape in side view, the chest portion protecting bag portion having a top-bottom two-level chamber structure defining an upper-side chamber and a lower-side chamber and including a non-inflating portion that is substantially L-shaped in side view, to which the gas is not supplied, the non-inflating portion extending from a peripheral edge portion of a vehicle front side of the side airbag to outer peripheral portions of the waist portion protecting bag portion and the chest portion protecting bag portion and having a substantially vertical section extending vertically along the peripheral edge portion of the vehicle front side of the side airbag and a substantially horizontal section extending horizontally between the lower-side chamber of the chest portion protecting bag portion and the waist portion protecting bag portion, so that a front-most end portion of the lower-side chamber of the chest portion protecting bag portion is arranged at a position closer to a vehicle rear side than is a front-most end portion of the waist portion protecting bag portion,
the side airbag is configured such that, at a time of expansion, (i) gas that is jetted out from the inflator is supplied more promptly to the waist portion protecting bag portion than to the chest portion protecting bag portion, (ii) a front side upper end portion of the waist portion protecting bag portion slips between the seated passenger and a lower side of a webbing for waist portion restraining that is strip shaped and restrains the waist portion of the seated passenger so as to be located beneath the lower side of the webbing for waist portion restraining, and (iii) the chest portion protecting bag portion is arranged at an upper side of the webbing for waist portion restraining via the non-inflating portion,
the non-inflating portion is structured as a portion of two cloths that is formed by two base cloths being overlapped,
the non-inflating portion is surrounded by an outer peripheral sewn portion at the peripheral edge portion of the vehicle front side and an inner side sewn portion along outer shapes of the waist portion protecting bag portion and the chest portion protecting bag portion, and
the non-inflating portion connects, in a vehicle vertical direction, the waist portion protecting bag portion and the chest portion protecting bag portion.

2. The side airbag device of claim 1, wherein
the outer peripheral sewn portion includes a turn-in portion, that turns-in toward the vehicle rear side at an upper side of the front side upper end portion of the waist portion protecting bag portion.

3. The side airbag device of claim 1, wherein the non-inflating portion includes a hollowed-out portion, that is hollowed-out toward the vehicle rear side with respect to a line segment that connects, in the vehicle vertical direction, the front side upper end portion of the waist portion protecting bag portion and a front side upper end portion of the chest portion protecting bag portion.

4. The side airbag device of claim 3, wherein the hollowed-out portion is formed in a range that extends from the front side upper end portion of the waist portion protecting bag portion to at least a front end portion of a lower portion of the chest portion protecting bag portion.

5. The side airbag device of claim 1, wherein, at the waist portion protecting bag portion, an outer periphery of a front side upper portion, that includes the front side upper end portion, and an outer periphery of a front side lower portion are both formed by arc-shaped curves in side view, and a radius of the outer periphery of the front side upper portion is larger than a radius of the outer periphery of the front side lower portion.

6. The side airbag device of claim 2, wherein the non-inflating portion includes a hollowed-out portion, that is hollowed-out toward the vehicle rear side with respect to a line segment that connects, in the vehicle vertical direction, the front side upper end portion of the waist portion protecting bag portion and a front side upper end portion of the chest portion protecting bag portion.

7. The side airbag device of claim 2, wherein, at the waist portion protecting bag portion, an outer periphery of a front side upper portion, that includes the front side upper end portion, and an outer periphery of a front side lower portion are both formed by arc-shaped curves in side view, and a radius of the outer periphery of the front side upper portion is larger than a radius of the outer periphery of the front side lower portion.

8. The side airbag device of claim 3, wherein, at the waist portion protecting bag portion, an outer periphery of a front side upper portion, that includes the front side upper end portion, and an outer periphery of a front side lower portion are both formed by arc-shaped curves in side view, and a radius of the outer periphery of the front side upper portion is larger than a radius of the outer periphery of the front side lower portion.

9. The side airbag device of claim 6, wherein, at the waist portion protecting bag portion, an outer periphery of a front side upper portion, that includes the front side upper end portion, and an outer periphery of a front side lower portion are both formed by arc-shaped curves in side view, and a radius of the outer periphery of the front side upper portion is larger than a radius of the outer periphery of the front side lower portion.

10. The side airbag device of claim 4, wherein, at the waist portion protecting bag portion, an outer periphery of a front side upper portion, that includes the front side upper end portion, and an outer periphery of a front side lower portion are both formed by arc-shaped curves in side view, and a radius of the outer periphery of the front side upper portion is larger than a radius of the outer periphery of the front side lower portion.

* * * * *